United States Patent
Chou et al.

(10) Patent No.: US 10,551,872 B2
(45) Date of Patent: Feb. 4, 2020

(54) WEARABLE DEVICE EXHIBITING CAPACITIVE SENSING FUNCTION

(71) Applicant: Touchplus Information Corp., New Taipei (TW)

(72) Inventors: Yen-Han Chou, New Taipei (TW); Shih-Hsien Hu, New Taipei (TW); Yaosheng Chou, New Taipei (TW)

(73) Assignee: TOUCHPLUS INFORMATION CORP., New Taipei (TW)

( * ) Notice: Subject to any disclaimer, the term of this patent is extended or adjusted under 35 U.S.C. 154(b) by 167 days.

(21) Appl. No.: 15/266,237

(22) Filed: Sep. 15, 2016

(65) Prior Publication Data

US 2017/0075481 A1    Mar. 16, 2017

(30) Foreign Application Priority Data

Sep. 15, 2015   (TW) .............................. 104130428 A

(51) Int. Cl.
  *G06F 3/045*  (2006.01)
  *G06F 1/16*   (2006.01)
  *G06F 3/044*  (2006.01)

(52) U.S. Cl.
  CPC .............. *G06F 1/163* (2013.01); *G06F 3/044* (2013.01)

(58) Field of Classification Search
  CPC . G06F 1/163; G06F 2203/04112; G06F 3/044
  See application file for complete search history.

(56) References Cited

U.S. PATENT DOCUMENTS

| 2010/0053078 A1* | 3/2010 | Kim ........................ G06F 3/016 345/156 |
| 2014/0035865 A1 | 2/2014 | Hu |
| 2014/0097885 A1 | 4/2014 | Hu |
| 2014/0267137 A1* | 9/2014 | Solven .................. G06F 3/0416 345/174 |
| 2014/0333575 A1 | 11/2014 | Hu |
| 2015/0084921 A1 | 3/2015 | Hu |
| 2015/0116261 A1* | 4/2015 | Ahn ...................... G06F 3/0418 345/174 |
| 2015/0160762 A1 | 6/2015 | Hu |

FOREIGN PATENT DOCUMENTS

| CN | 101339454 | 6/2010 |
| CN | 103257777 | 8/2013 |
| CN | 104461344 | 3/2015 |
| CN | 204285285 | 4/2015 |
| CN | 104622441 | 5/2015 |

(Continued)

OTHER PUBLICATIONS

CNIPA, "Office Action", dated May 30, 2019.

*Primary Examiner* — Insa Sadio
(74) *Attorney, Agent, or Firm* — WPAT, PC

(57) ABSTRACT

A wearable device exhibiting a capacitive sensing function includes a fabric having a plurality of touch-sensing electrode patterns and a plurality of signal lines distributed therein; a controlled device integrated into the fabric; and a control circuit disposed at an edge of the fabric and being in communication with the signal lines for controlling the controlled device according to a capacitance change according to a capacitance change caused by a touch or gesture of a user on the fabric.

9 Claims, 6 Drawing Sheets

(56) References Cited

FOREIGN PATENT DOCUMENTS

| | | |
|---|---|---|
| TW | 201044416 | 12/2010 |
| TW | 201407430 | 2/2014 |
| TW | 201415334 | 4/2014 |
| TW | 201443754 | 11/2014 |
| TW | 201523413 | 6/2015 |

* cited by examiner

WEARABLE DEVICE EXHIBITING CAPACITIVE SENSING FUNCTION

FIELD OF THE INVENTION

The present invention relates to a wearable device exhibiting a capacitive sensing function, and more particularly to a fabric wearable device exhibiting a capacitive sensing function.

BACKGROUND OF THE INVENTION

Wearable devices have been more and more popular, and have been developed for a variety of applications. Meanwhile, touch sensing techniques are widely used and continue to progress. However, the integration of a wearable device into a fabric product such as a garment is still a challenge, let alone a fabric wearable device exhibiting a capacitive sensing function.

SUMMARY OF THE INVENTION

Therefore, the present invention provides a fabric wearable device exhibiting a capacitive sensing function to allow a user to perform input in an easy and intuitive way.

An aspect of the present invention provides a wearable device exhibiting a capacitive sensing function, comprising one or more capacitive sensing portions. At least one of the capacitive sensing portions comprises: a fabric having a plurality of touch sensing electrode patterns and a first set of signal lines distributed therein; a controlled device integrated into the fabric; and a control circuit coupled to the fabric and being in communication with the first set of signal lines for controlling the controlled device according to a capacitance change caused by a touch or gesture of a user on the fabric.

Another aspect of the present invention provides a wearable device exhibiting a capacitive sensing function, comprising one or more capacitive sensing portions. At least one of the capacitive sensing portions comprises: a first fabric sensing electrode layer formed with sensing electrode yarns; a second fabric sensing electrode layer formed with sensing electrode yarns; a fabric dielectric layer formed with non-conductive yarns and disposed between the first fabric sensing electrode layer and the second fabric sensing electrode layer; and a control circuit coupled to the capacitive sensing portion, and issuing a control signal according to a capacitance change caused by a distance or electric field change between the first and second fabric sensing electrode layers.

A further aspect of the present invention provides a wearable device exhibiting a capacitive sensing function, comprising one or more capacitive sensing portions. At least one of the capacitive sensing portions comprises: a fabric having a plurality of touch sensing electrode patterns distributed therein; and a control circuit coupled to the fabric and being in communication with the plurality of touch sensing electrode patterns for issuing a control signal when a specific event occurs, wherein whether the specific event occurs or not is determined according to a capacitance change caused by a contact of an object on the fabric, together with a capacitance change amount or a capacitance change rate.

A yet another aspect of the present invention provides a wearable device exhibiting a capacitive sensing function, comprising one or more capacitive sensing portions. At least one of the capacitive sensing portions comprises: a first fabric having a plurality of touch sensing electrode patterns distributed therein and attached onto the motional object at a first position; and a control circuit in communication with the plurality of touch sensing electrode patterns for controlling a first action of the motional object according to a capacitance change caused by a touch or gesture of a user on the first fabric.

In an embodiment, another one of the capacitive sensing portions comprises: a second fabric having a plurality of touch sensing electrode patterns distributed therein and attached onto the motional object at a second position; and a control circuit in communication with the plurality of touch sensing electrode patterns for controlling a second action of the motional object according to a capacitance change caused by a touch or gesture of a user on the second fabric.

BRIEF DESCRIPTION OF THE DRAWINGS

The invention will become more readily apparent to those ordinarily skilled in the art after reviewing the following detailed description and accompanying drawings, in which.

DETAILED DESCRIPTION OF PREFERRED EMBODIMENTS

The invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
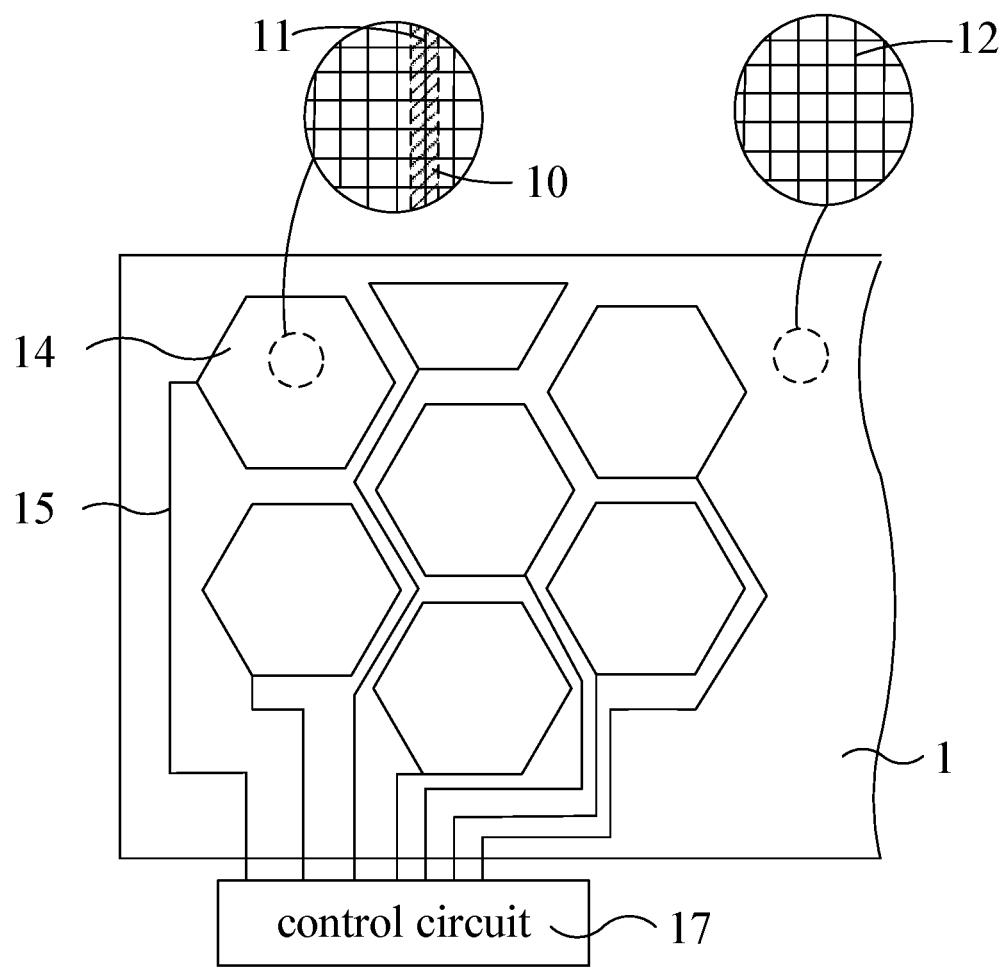
FIG. 1A is a schematic diagram illustrating a portion of a fabric wearable device where capacitive sensing can be conducted according to a first embodiment of the present invention.

Please refer to FIG. 1A, which is a schematic diagram illustrating a portion of a fabric wearable device where capacitive sensing can be conducted according to a first embodiment of the present invention. Conventionally, capacitive sensing means is additionally formed on a rigid or flexible substrate to function for touch sensing control. In the invention, capacitive sensing electrodes, as well as associated circuitry, are integrated into a fabric product to form a fabric wearable device. In this embodiment, the capacitive sensing electrodes serve as yarns which are weaved into a fabric 1 together with normal yarns 12 such as threads of cotton, wool, nylon, and etc. The capacitive sensing electrode yarns in this embodiment are produced by wrapping individual conductive wires 11 with dielectric material 10. The capacitive sensing electrode yarns are distributed in a specific portion of the fabric 1, and form a plurality of touch-sensing electrode patterns, where touch sensing can be conducted. For example, each touch-sensing electrode pattern 14 is formed with one piece of yarn, which is adaptively wound to form the desired pattern, e.g. a hexagon. Furthermore, the piece of yarn extends out of the pattern 14 to function as a signal line 15 of the touch-sensing electrode pattern 14. The signal lines 15 of a plurality of the touch-sensing electrode patterns 14 belonging to the same touch sensing control portion are then grouped at a suitable position, e.g. at an edge of the fabric, where a control circuit 17 is attached to or embedded in the fabric. Alternatively, the control circuit 17 may be an external device. In this embodiment, each of the touch sensing electrode patterns 14 is electrically connected to the control circuit 17 via an exclusive one of the signal lines 15. In this embodiment, the control circuit 17 specifically works for the illustrated touch-sensing control portion to control one or more controlled devices. Alternatively, the control circuit 17 may be a control center of all the touch-sensing control portions and associated controlled devices included in the same fabric wearable device 1. For example, the control circuit 17 controls light emission of a plurality of LED units (not shown) installed in the fabric to change colors, adjust brightness and/or show other effects in response to touch or gesture operations on one or more of the touch-sensing control portions. In another example, the controlled device is an MP3 player (not shown), and the control circuit 17 changes tracks, adjust volumes and/or render other effects in response to touch or gesture operations on one or more of the touch-sensing control portions.

Figure 1B:
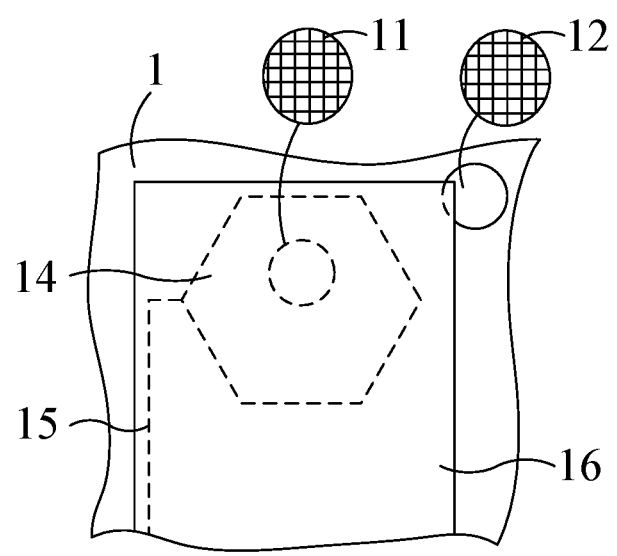
FIG. 1B is a schematic diagram illustrating a portion of a fabric wearable device where capacitive sensing can be conducted according to a second embodiment of the present invention.

FIG. 1B schematically illustrates a portion of a fabric wearable device where capacitive sensing can be conducted according to a second embodiment of the present invention. In this embodiment, the conductive wires 11 serving as touch-sensing electrodes are weaved into a fabric together with other yarns 12 without being wrapped with any dielectric material in advance. Likewise, the touch-sensing electrode yarns form a plurality of touch-sensing electrode patterns 14 and signal lines 15. Afterwards, a dielectric material layer 16 is applied onto the touch-sensing electrode patterns 14 and the signal lines 15 by way of printing, sewing or weaving to provide one or more touch-sensing zones. The dielectric material layer 16, like a conventional cover lens, may be applied in a full lamination way or an edge lamination way for protection.

Figure 1C:
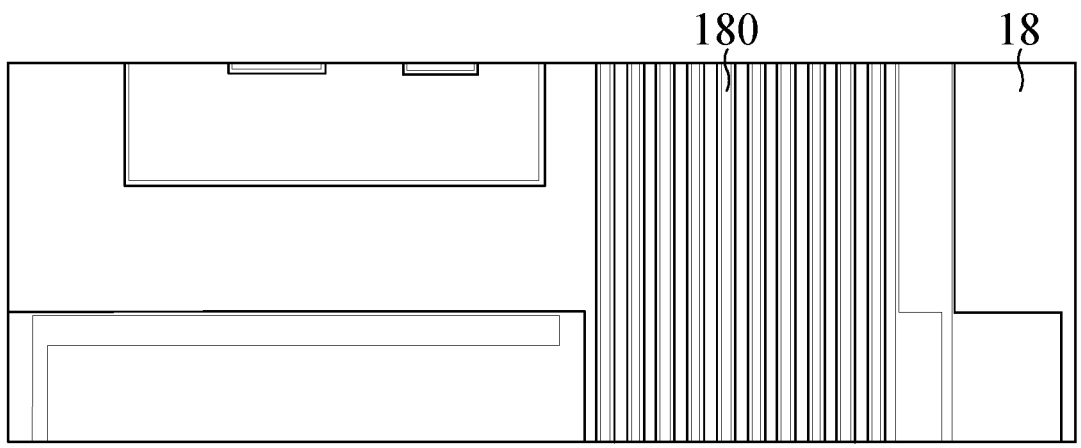
FIGS. 1C, 1D and 1E are schematic diagrams illustrating an example of electric connection of the signal lines to the control circuit.
Figure 1D:
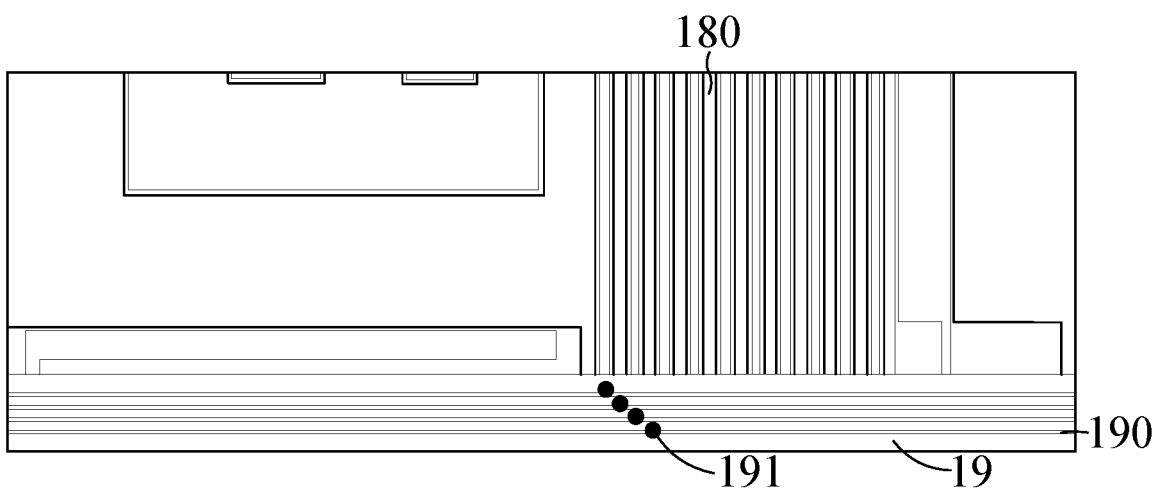
Figure 1E:
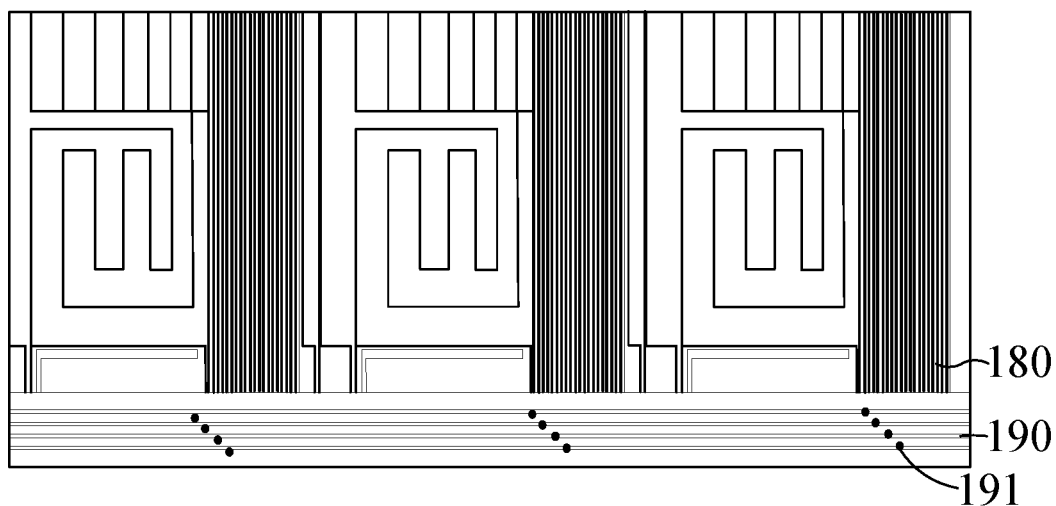

As described above, in either the embodiment illustrated in FIG. 1A or the embodiment illustrated in FIG. 1B, the signal lines 15 are made to electrically connect to the control circuit 17 for transmitting sensing signals. In a specific example, a multi-layer crossline structure may be adopted for the connection by bonding one or more layers of additional fabric onto the resulting fabric of FIG. 1A or 1B. Please refer to FIG. 1C, FIG. 1D and FIG. 1E. An additional fabric 19, which is weaved with a set of signal lines 190, is bonded to a fabric 18, which is weaved with a set of signal lines 180. The set of signal lines 180 are electrically connected to the touch-sensing electrodes. By bonding the fabric 19 onto the fabric 18 while electrically connecting the signal lines 190 to the signal lines 180 at points 191, the signal lines can be properly connected to the control circuit in parallel.

The touch-sensing electrode patterns 14 and signal lines 15 as shown in FIG. 1A and FIG. 1B may be implemented with a single layer structure, and alternatively, may also be implemented with a double layer structure. The implementation details have been described in US Patent Publication Nos. US 2014/0035865 A1, US 2014/0333575 A1 and US 2015/0160762 A1 assigned to the same assignee as the present application, and will not be redundantly described herein. It is to be particularly pointed out that the double-line touch sensing control techniques described in the latter two documents reduce sensitivity of capacitive coupling between adjacent sensing electrodes, and thus the clearance between the adjacent sensing electrodes is not critical. Accordingly, possible variation of the clearance between yarns due to stretching, shrinkage or wetting of the fabric can be ignored while effectively conducting touch sensing control. Furthermore, since the double-line touch sensing control techniques allows touch sensing control to be conducted under a high-resistance condition, high-resistance touch-sensing electrode yarns can be used to lower the conductance of the fabric for safety purpose.

In an example, a touch-sensing control portion including the touch-sensing electrode patterns 14 and the signal lines 15 and the control circuit 17 are integrated into a button, e.g. printed on the button or embedded in the button, and sewn onto a fabric with a conductive thread. The conductive thread makes the controlled device(s) installed on or embedded in the fabric communicable with the circuit on the button and respond to a touch or gesture operation at the button. In another example, the touch-sensing control portion including the touch-sensing electrode patterns 14 and the signal lines 15 is integrated into a fabric, e.g. printed on the fabric, weaved into the fabric or embedded into the fabric, the control circuit 17 is integrated into a button, and the button is sewn onto the fabric with a conductive thread. The conductive thread communicates the touch-sensing control portion in the fabric with the control circuit in the button, and meanwhile, communicates the controlled device(s) in the fabric with the control circuit in the button.

In a further example, the touch-sensing control portion integrated into a fabric may serve as a target and senses a hit of a shooting object thereonto by way of touch sensing. For safety considerations, it is desirable that the shooting object is relatively light while the hit sensing can be readily made. A touch sensing technique would be a good solution. With the use of a touch-sensing control portion according to the present invention for hit sensing, a light and safe plastic bullet made of non-expanding recreational foam, e.g. a nerf material, and including a conductive member e.g. a carbon film or a metal film, at a tip thereof can be used as the shooting object. To avoid interference of any irrelevant conductive object, e.g. a finger, the control circuit or any other suitable device included in the wearable device further detects a capacitance change amount and/or a capacitance change rate in addition to hit sensing to confirm whether the sensed hit is caused by a valid shooting object whose motion and contact with the touch-sensing control portion are supposed to be quick. Once the occurrence of a hit is determined and confirmed, a controlled device may be triggered to issue a visible or audible alarm signal.

Figure 2:
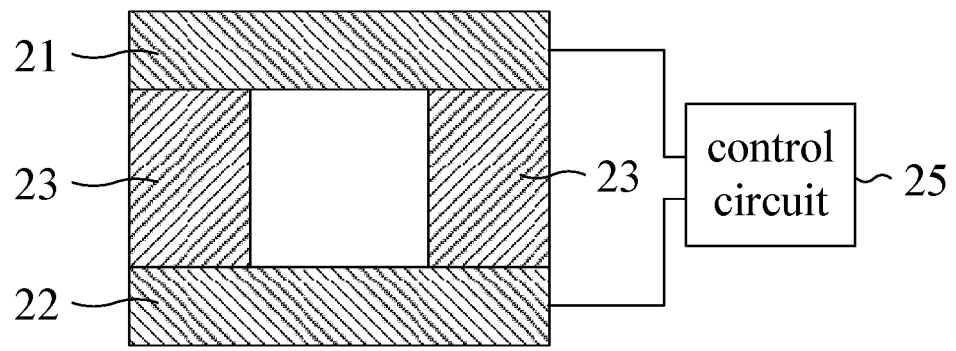
FIG. 2 is a schematic diagram illustrating a portion of a fabric wearable device where capacitive sensing can be conducted according to a third embodiment of the present invention.

Please refer to FIG. 2, which is a schematic diagram illustrating a portion of a fabric wearable device where capacitive sensing can be conducted according to a third embodiment of the present invention. Different from the above embodiments, the touch-sensing control portion in this embodiment has a double-layer electrode structure spaced with a dielectric layer. The touch sensing control principle is similar to that described in US Patent Application No. 2014/0097885 A1 assigned to the same assignee as the present application, which is not to be redundantly described herein, except that the electrode layers 21 and 22 and the dielectric layer 23 are all implemented with fabric. Each of the fabric electrode layers 21 and 22 is weaved with conductive wires, while the fabric dielectric layer 23 is weaved with common yarns. Likewise, the touch-sensing control portion is electrically connected to a control circuit 25. In this embodiment, there is clearance existing between the electrode layers 21 and 22, and the touch-sensing control portion can thus perform not only touch or gesture sensing control but also press sensing control in response to a capacitance change resulting from a distance or electric-field change. The control circuit 25 then outputs corresponding control signals to control the operations of the controlled devices.

In this embodiment, the dielectric layer 23 is implemented with a fabric or a porous material such as foam. It is understood that when temperature, humidity or pressure changes, dimension of the dielectric layer 23 might also change so that the clearance between the electrode layers 21 and 22 changes as well. Accordingly, changes of capacitance and/or associated parameters can be detected. The control circuit realizes the changes and issue corresponding control signals. For example, the fabric wearable device may be a temperature-sensitive device, a pressure-sensitive device such as a soft keyboard, or a humidity-sensitive device such as a diaper. According to the sensing results, the control circuit issues a control signal, for example, indicative of key enablement of the soft keyboard, or wetting status of the diaper. The transmission of the control signal may be either a wire-connecting or wireless way.

Take a diaper as an example of the fabric wearable device. When the control circuit issues a control signal indicative of wetting status of the diaper, the control signal may be wirelessly transmitted to a smart phone, a computer or an associate device with a signal receiver to inform of a caregiver. In another example, the fabric wearable device is underclothes, and a portion of the underclothes, which is made of the electrode layers 21 and 22 and the dielectric layer 23, is near the heart of the user who is wearing the underclothes. Under this circumstance, for example data of the body temperature or the heartbeat of the user can be detected and transmitted out as described above. In the above-described embodiment, the dielectric material is a layer clamped between the two electrode layers. Alternatively, the dielectric material may wrap individual conductive wires so as to exhibit a similar function. Furthermore, a two-dimensional capacitive touch sensor with a single side ITO (SITO) structure may also be used for temperature sensing, humidity sensing or pressure sensing (breath and heartbeat detection).

Figure 3A:
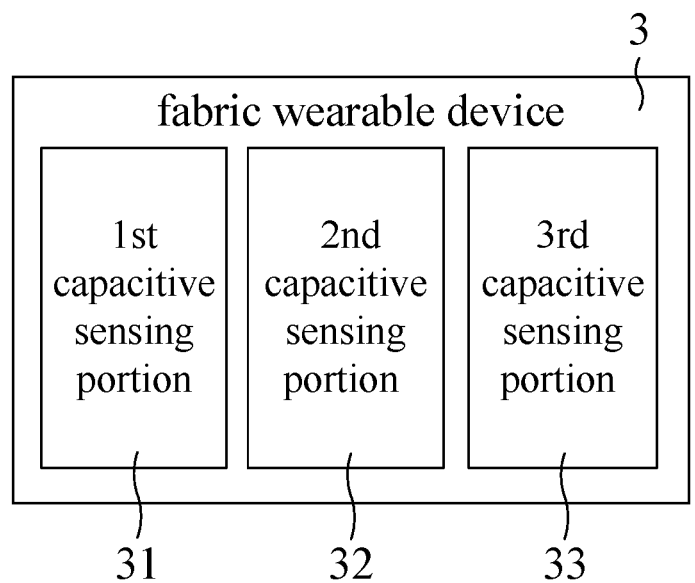
FIG. 3A is a schematic diagram illustrating a portion of a fabric wearable device where capacitive sensing can be conducted according to a fourth embodiment of the present invention.

Please refer to FIG. 3A, which is a schematic diagram illustrating a portion of a fabric wearable device where capacitive sensing can be conducted according to a fourth embodiment of the present invention. In this embodiment, the fabric wearable device 3 includes a plurality of capacitive sensing portions, i.e. first, second and third capacitive sensing portions 31, 32 and 33. For example, the first capacitive sensing portion 31 is a touch sensing key area, the second capacitive sensing portion 32 is a fingerprint identifying area, and the third capacitive sensing portion 33 is a heartbeat/temperature sensing area. For different functional area, different fabric properties are required. For example, the structural densities of the three area may be different. In addition, a wireless module such as wireless communication or near-field communication may be integrated into the fabric. In this way, the wearable device may function as an IoT (Internet of Things) object.

Figure 3B:
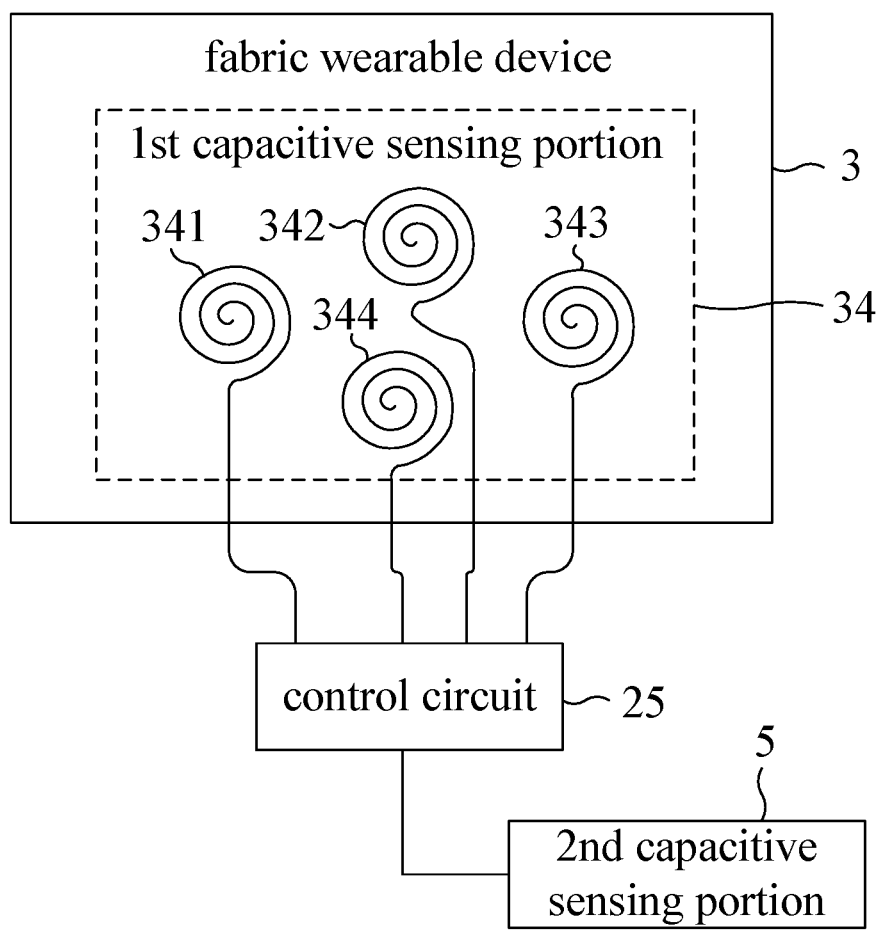
FIG. 3B is a schematic diagram illustrating a portion of a fabric wearable device where capacitive sensing can be conducted according to a fifth embodiment of the present invention.

Please refer to FIG. 3B, which is a schematic diagram illustrating a portion of a fabric wearable device where capacitive sensing can be conducted according to a fifth embodiment of the present invention. In this embodiment, a first capacitive sensing portion 34 is integrated into a fabric 3 and includes a plurality of sensing electrodes 341, 342, 343 and 344. The fabric 3, for example, may be made to form a nose tip of a robot dog. The sensing electrodes 341, 342, 343 and 344 are electrically connected to a control circuit 25, which may be independent or integrated into the control center of the robot dog, and the capacitive sensing portion 34 is driven by the control circuit 25 to execute a touch sensing control function in response to a user's touch or gesture thereat. In an example, a floating touch sensing technique as described in Chinese Patent Publication No. CN 104451344 (US Patent Publication No. US20150084921-A1) assigned to the same assignee as the present application, which are not to be redundantly described herein, is adopted for the touch sensing control. With the floating touch sensing control, which allows touch sensing control to be conducted at positions about 5-10 cm from the sensing electrodes, a variety of interactions with the robot dog can be performed. For example, when the user's hand or finger slides leftwards over the capacitive sensing portion 34, the control circuit 25 issues a first control signal according to the sensing result of the sensing electrodes 341, 342, 343 and 344 to control the robot dog to do a leftward roll; when the user's hand or finger slides rightwards over the capacitive sensing portion 34, the control circuit 25 issues a second control signal according to the sensing result of the sensing electrodes 341, 342, 343 and 344 to control the robot dog to do a rightward roll; when the user's hand or finger draws circles over the capacitive sensing portion 34, the control circuit 25 issues a third control signal according to the sensing result of the sensing electrodes 341, 342, 343 and 344 to control the robot dog turns around; and so on. In addition, a second capacitive sensing portion 5 may be integrated into the fabric 3 or a separate fabric and includes a plurality of sensing electrodes (not shown) disposed on the body of the robot dog, e.g. on the back. Likewise, the sensing electrodes of the second capacitive sensing portion 5 may be electrically connected to another independent control circuit or the control circuit 25, and the capacitive sensing portion 34 is driven by the control circuit to execute a touch sensing control function in response to a user's touch or gesture thereat. For example, with a caress touch on the second capacitive sensing portion 5, a preset state or mode of the robot dog, e.g. lying down or wagging a tail, is entered. In this way, interaction of the user with the robot dog can be performed.

Figure 4:
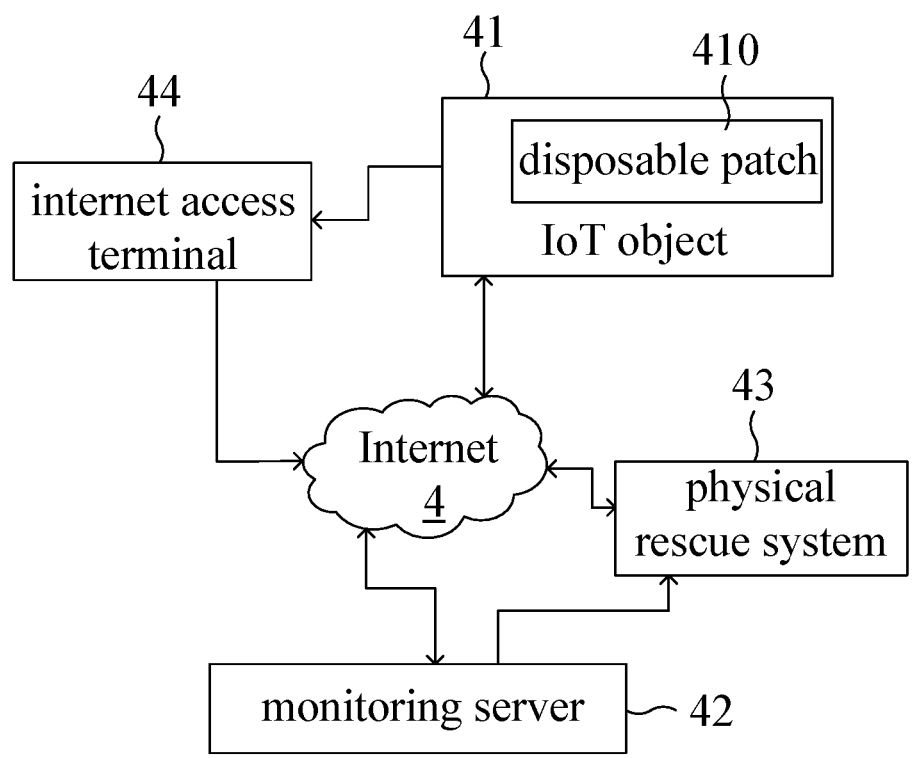
FIG. 4 is a scheme exemplifying an application of a fabric wearable device according to the present invention.

As described above, a fabric wearable device exhibiting a capacitive sensing function according to the present invention can be produced as a disposable patch to detect health indices of a user who is wearing the device. In an embodiment as illustrated in FIG. 4, the disposable patch 410 may serve as an IoT (Internet of Things) object 41 if an identifying code is given to the disposable patch 410. With the identifying code, the disposable patch 410 can be associated with a registered user and one or more ordered services in the monitoring server 42. For example, the body temperature and/or heartbeat of the user who is wearing a shirt attached with the disposable patch 410 at a near-chest position. The IoT object 41 then transmits out the detected body temperature and/or heartbeat data together with the identifying code via an electric connection module, a wireless communication module or a near field communication module. According to the identifying code, the data can be recorded into a database in the monitoring server 42 specific to the user, and accordingly, one or more preset services can be provided for the user. If there is any abnormal status determined from the continuously recorded data, an alarm is issued, and when necessary, a physical rescue system 43, e.g. a contact person, a designated hospital and/or a security company, is automatically notified by way of telephone calls, mobile phone messages, website instant communication software or any suitable tool, in order to take necessary actions. If an internet access terminal 44 is available, the user may dynamically select services, e.g. choosing an insurance item or designating a hospital. If another patch attached onto another wearable device has been registered in the same account, both the patches can serve as the IoT objects for executing the same task together.

As described above, by combining the capacitive sensing techniques and the weaving techniques according to the present invention, a fabric wearable device exhibiting a capacitive sensing function can be produced so that the capacitive sensing control applications can be further diversified. It is to be noted that the conductive wires mentioned above are generally metal wires. Alternatively, it is possible to use non-metal high-impedance material such as polymer in the present invention to serve as the conductive wires if suitable touch sensing control techniques are adopted. Furthermore, different material may be used as the conductive wires in different capacitive sensing portions for different applications.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A wearable device exhibiting a capacitive sensing function, comprising one or more capacitive sensing portions, wherein at least one of the capacitive sensing portions comprises:
    a fabric having a plurality of touch sensing electrode patterns and a first set of signal lines distributed therein;
    a controlled device integrated into the fabric;
    a control circuit coupled to the fabric and being in communication with the first set of signal lines for controlling the controlled device according to a capacitance change caused by a touch or gesture of a user on the fabric, and
    a wireless communication module or a near field communication module, wherein the at least one of the capacitive sensing portions is preset with an identifying code for linking to an internet system as an IoT object.

2. The wearable device according to claim 1, wherein the controlled device is one or more LED units, whose colors and/or brightness change in response to the touch or gesture of a user on the fabric.

3. The wearable device according to claim 1, wherein the controlled device is an MP3 player, whose tracks and/or volume change in response to the touch or gesture of a user on the fabric.

4. The wearable device according to claim 1, wherein each of the touch sensing electrode patterns is electrically connected to the control circuit via an exclusive one of the first set of signal lines, and each of the touch sensing electrode patterns is formed with one piece of touch sensing electrode yarn that is made of one conductive wire wrapped with a dielectric material, wherein the touch sensing electrode yarn further extends out of the touch sensing electrode pattern to serve as the exclusive signal line.

5. The wearable device according to claim 1, further comprising another fabric integrated thereinto a second set of signal lines, wherein the another fabric is bonded to the fabric while electrically connecting the second set of signal lines to the first set of signal lines so as to have the first set of signal lines connected to the control circuit in parallel via the second set of signal lines.

6. A wearable device exhibiting a capacitive sensing function, comprising one or more capacitive sensing portions, wherein at least one of the capacitive sensing portions comprises:
    a first fabric sensing electrode layer formed with sensing electrode yarns;
    a second fabric sensing electrode layer formed with sensing electrode yarns;
    a fabric dielectric layer formed with non-conductive yarns and disposed between the first fabric sensing electrode layer and the second fabric sensing electrode layer; and
    a control circuit coupled to the capacitive sensing portion, and issuing a control signal according to a capacitance change caused by a distance or electric field change between the first and second fabric sensing electrode layers,
    wherein the capacitive sensing portion further comprises a wireless communication module or a near field communication module, and is preset with an identifying code for linking to an internet system as an IoT object.

7. The wearable device according to claim 6, wherein the sensing electrode yarns of the first and second fabric electrode layers are conductive wires, and the non-conductive yarns are porous.

8. The wearable device according to claim 6, wherein a plurality of the capacitive sensing portions are included in the wearable device, and have different structural densities for different objectives.

9. The wearable device according to claim 6, wherein the control signal issued by the control circuit contains the identifying code.

* * * * *